H. HOWELL.
WORK HOLDER.
APPLICATION FILED OCT. 5, 1911.
1,033,758.
Patented July 23, 1912.
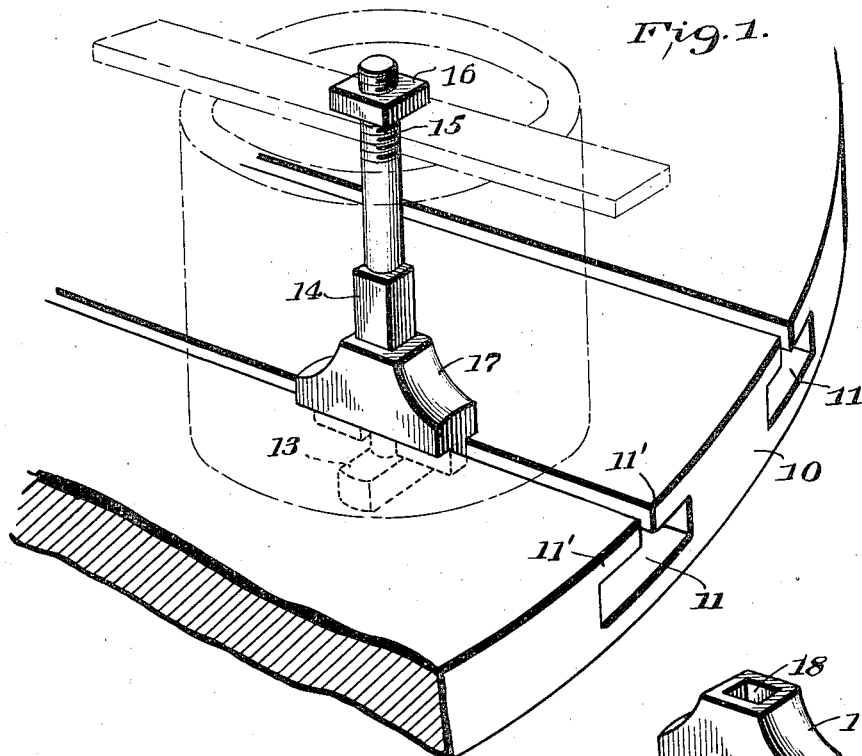
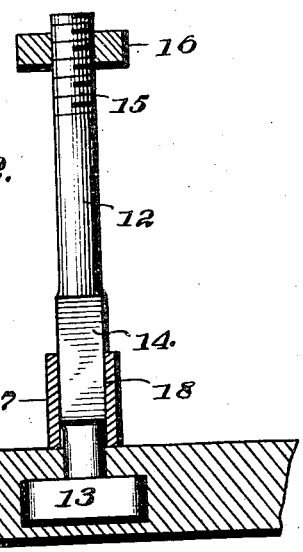
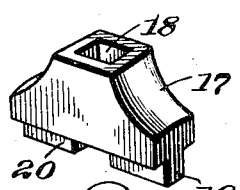

UNITED STATES PATENT OFFICE.

HARRY HOWELL, OF WAVERLY, NEW YORK.

WORK-HOLDER.

1,033,758.   Specification of Letters Patent.   Patented July 23, 1912.

Application filed October 5, 1911. Serial No. 652,933.

*To all whom it may concern:*

Be it known that I, HARRY HOWELL, a citizen of the United States, and resident of Waverly, in the county of Tioga and State of New York, have invented certain new and useful Improvements in Work-Holders, of which the following is a specification.

This invention relates to work-holders, and more particularly to devices for holding work on the tables of machine tools.

The objects of the invention are to provide a device of this kind which may be readily put into position after the work is in place on the table, and which will be firmly held against rotation when the nut or other securing means is being tightened.

The novel features of the invention will be apparent from the following description taken in connection with the accompanying drawings.

In the drawings: Figure 1 is a perspective view of the invention as applied to the table of a machine tool. Fig. 2 is a longitudinal section of the invention, a portion of the table being also shown. Fig. 3 illustrates in perspective the various parts of the invention.

Referring to the drawings the table of a machine tool is indicated by the numeral 10 and is provided with the usual T-slots 11. A piece of work is shown in dotted lines on the table and is secured in position by the bolt 12 having a T-head 13, and a portion of its shank of rectangular cross section as shown at 14. The end of the bolt is provided with the usual screw-threads 15, which are engaged by the nut 16. The bolt is inserted downwardly into the slot and turned through 90° so that the head will engage the ledges 11'. In order to prevent the bolt from turning a sleeve 17 is provided. This sleeve has a rectangular opening 18 extending longitudinally therethrough and adapted to slide on the rectangular portion 14 of the bolt. The lower side of the sleeve is provided with projections 19 and 20 arranged on opposite sides of the opening 18 and when the sleeve is dropped into position, as shown in Fig. 1, the projections 19 and 20 engage the slot 11 and, as will be readily understood, hold the bolt upright and also prevent its turning in the slot. When the bolt is in position the nut 16 may be tightened in the usual manner and the work firmly secured to the table.

It will be readily understood that various changes within the scope of the claims may be made in the details of construction of the device without departing from the invention. For instance, the rectangular portion 14 may be made of any other non-circular cross section which will prevent the sleeve 17 from turning relatively thereto, and therefore where I use the term "angular" in the claims to define the construction of this portion of the bolt I intend to include any construction which will prevent this relative turning.

Having thus described my invention what I claim as new and desire to secure by Letters-Patent is:

1. In a device of the class described, the combination with a bolt having a head and a threaded nut, of a sleeve arranged on said bolt and adapted to slide longitudinally thereof and provided with a projection extending toward said head, and means coöperating between the bolt and sleeve for preventing said sleeve from rotating relatively to the bolt.

2. In a device of the class described, the combination of, a bolt having a T-head and a threaded nut, a sleeve arranged on said bolt and adapted to slide longitudinally thereof and provided with projections on opposite sides of the bolt extending toward said head, and means coöperating between the bolt and sleeve for preventing said sleeve from rotating relatively to the bolt.

3. In a device of the class described, the combination with a table having a T-slot in one surface, of a bolt having a head adapted to be inserted into the slot from the side thereof and turned to a position to be held in the slot, a member slidable on said bolt into engagement with said slot, and means coöperating between the bolt and said member for holding said bolt against rotation relatively to said member when the latter is in engagement with the slot.

4. In a device of the class described, the combination of a bolt having a T-head and a shank provided with a portion of angular cross section spaced from the head, and a member adapted to slide on said angular portion and having a projection extending toward the head of the bolt.

5. In a device of the class described, the combination of a bolt having a T-head and a shank provided with a rectangular portion spaced from the head, and a sleeve slidably fitting said rectangular portion and having projections on opposite sides of the shank of the bolt extending toward the head thereof.

In testimony whereof I affix my signature in presence of two witnesses.

HARRY HOWELL.

Witnesses:
 I. G. DODGE,
 BERT HUCKLE.